Oct. 3, 1950 — H. E. KAMINKY — 2,524,261
LIQUID LEVEL ELECTRICAL TRANSMITTER
Filed Aug. 13, 1948 — 2 Sheets-Sheet 1

Inventor
Herbert E. Kaminky
by The Firm of Charles W. Hills
Attys

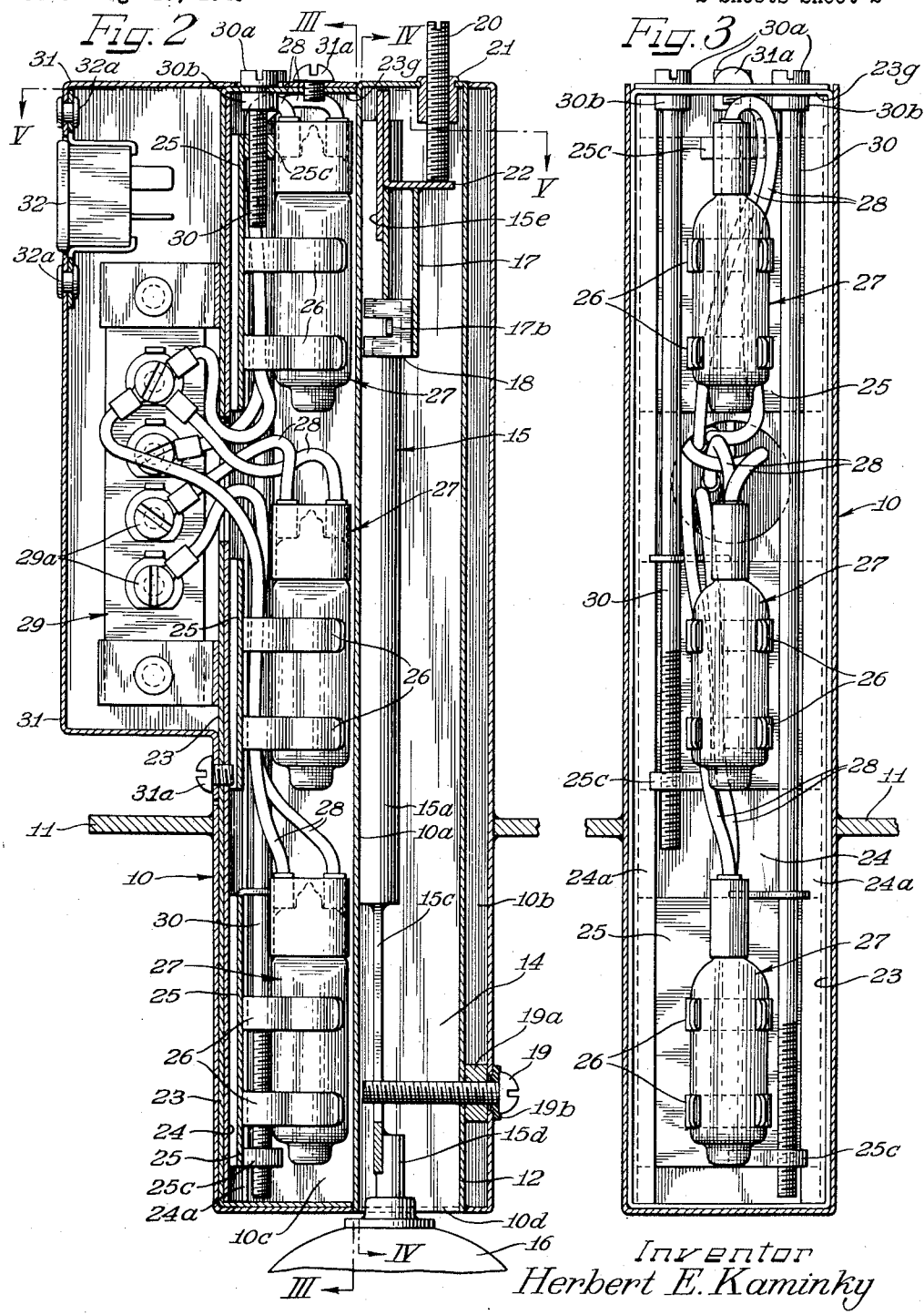

Patented Oct. 3, 1950

2,524,261

UNITED STATES PATENT OFFICE 2,524,261

LIQUID LEVEL ELECTRICAL TRANSMITTER

Herbert E. Kaminky, Chicago, Ill.

Application August 13, 1948, Serial No. 44,098

5 Claims. (Cl. 200—84)

This invention relates to a liquid level electrical transmitter and particularly to a device for detecting the liquid level in a closed container and initiating an electrical control action in response to such detection. While not limited thereto, this invention finds particular application in controlling water filling and water transfer operations of an automatic coffee urn.

There are many applications in industry in general wherein it is desired to initiate an electrical control action in response to variations in the level of a liquid disposed in a closed container. In many applications, the liquid whose level is to be controlled is at an elevated temperature, and furthermore, due to inclusion of deleterious substances in the liquid it will have a very substantial corrosive action upon any metallic members immersed in the liquid for any appreciable time.

Accordingly, it is an object of this invention to provide an improved liquid level electrical transmitter, and particularly to a liquid level device capable of producing an electrical control action in response to variations of the level of a liquid disposed within a closed container.

A particular object of this invention is to provide a liquid level electrical transmitter capable of use in an automatic coffee urn or similar applications wherein the liquid whose level is to be controlled has a substantial corrosive or deposition effect upon any component exposed to the liquid.

Still another object of this invention is to provide a liquid level electrical transmitter of the type employing a float operated magnet disposed within the liquid container which cooperates with a magnetically operable switch located on the opposite side of a wall which completely isolates the magnetic switch from any deleterious action by the liquid whose level is being measured.

An important object of this invention is to provide an improved construction of a float controlled, magnetically operated, liquid level electrical transmitter which permits convenient adjustment of the effective levels of liquid at which a control action is produced and furthermore, permits convenient replacement of the magnetic switch element in the unit without requiring that the entire unit be dissembled from the liquid container with which it is associated.

The specific nature of the invention, as well as other objects and advantages thereof, will become apparent to those skilled in the art from the following detailed description of the annexed sheets of drawings which, by way of preferred example only, illustrate one specific embodiment of the invention.

On the drawings:

Figure 2 is an enlarged scale sectional view taken on the plane II—II of Figure 1;

Figure 3 is a sectional view taken on the plane III—III of Figure 2;

As shown on the drawings:

Figure 1:
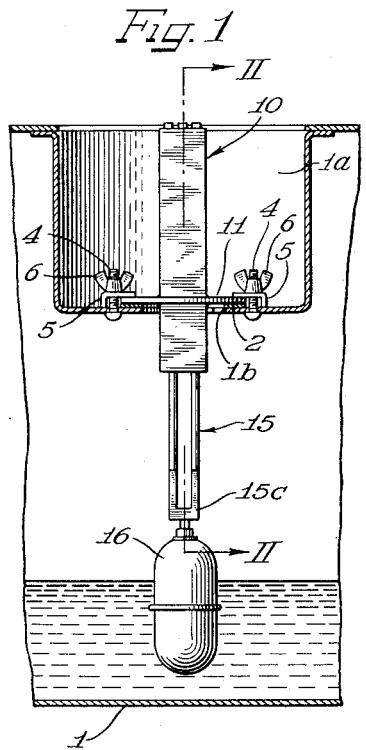
Figure 1 is a partial sectional view of a typical assemblage of a liquid level electrical transmitter embodying this invention in a liquid containing container.

As is shown in Figure 1, all of the major components of a liquid level electrical transmitter embodying this invention are housed in, or supported by, a sheet metal casing 10 which is of elongated, generally rectangular configuration and has a circular mounting plate 11 secured to its medial portion in any suitable manner, as by brazing or soldering. Mounting plate 11 is utilized to secure the casing 10 in sealed assemblage with a liquid container 1 which contains the liquid whose level is to be controlled or detected by the liquid level electrical transmitter. In the particular case of the application of the liquid level electrical transmitter to a coffee urn, the casing 10 may be conveniently disposed within a recessed well portion 1a formed at the top of the liquid container 1. One end of the casing 10 projects into the interior of the liquid container 1 through a substantially larger aperture 1b formed at the base portion of the well 1a. A sealing engagement is effected between the casing 10 and the liquid container 1 by an annular gasket 2 which is clamped between the mounting plate 11 and the base portion of the well 1a by a plurality of circumferentially spaced bolts 4 in cooperation with retaining angles 5 and wing nuts 6. In this manner, the entire liquid level electrical transmitter is sealingly yet detachably secured to the liquid container.

Referring particularly to Figures 2 through 5, it will be seen that the casing 10 is provided with a central vertical wall portion 10a which divides the interior of the casing 10 into two vertically extending, elongated closed bottomed chambers, respectively a primary chamber 10b and a secondary chamber 10c.

The primary chamber 10b is utilized to provide a vertical slide track to control the movement of a float controlled magnet while the secondary chamber 10c is utilized to mount one or more magnetically responsive switches which are successively actuated by the float controlled magnet as such becomes aligned therewith from the opposite side of the common wall 10a. It is therefore necessary that at least the common wall 10a of the casing 10 be formed of material having substantially non-magnetic properties.

Figure 4:
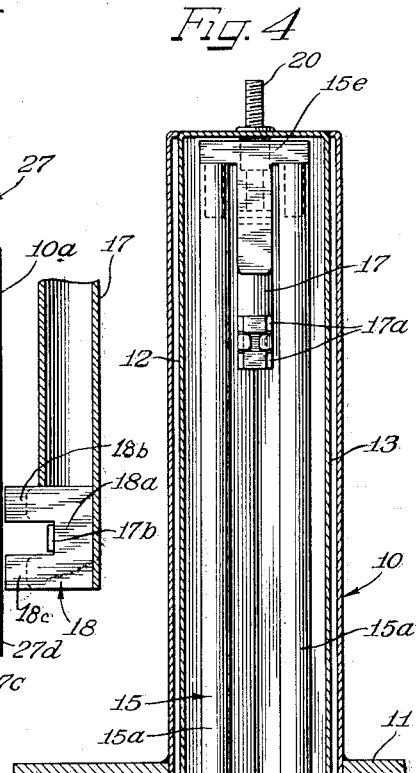
Figure 4 is a sectional view taken on the plane IV—IV of Figure 2.

Within the primary chamber 10b, a vertically extending slide track is defined in any convenient manner, such as by a pair of angularly disposed plates 12 and 13 which cooperate with common wall 10a to define a generally triangular cross-sectional chamber 14. The casing 10 as shown in Figures 2 and 4 has an opening 10d in the bottom wall thereof to provide communication between the chamber 14 and the interior of the liquid container 1 without, however, joining the chambers 10b and 10c with the interior. Since the wall 10a and plates 12 and 13 have one face thereof exposed to the liquid container 1, these members should be composed of non-corrosive material such as stainless steel, brass, etc.

The non-inserted end of the casing 10 has a substantial portion of its wall cut away to expose the secondary chamber 10c to the surrounding atmosphere. In particular, the top vertical wall of the chamber 10c is completely cut away and an elongated vertical slot 10e (Fig. 5) is provided in the side wall of the secondary chamber 10c which is opposite to the common wall 10a.

A magnet supporting frame 15 is slidably inserted within the triangular chamber 14 and guided thereby for vertical movement relative to the primary chamber 10b. The frame 15 may conveniently comprise a welded or brazed assemblage of a plurality of parallel tubes or rods 15a whose cylindrical surfaces slidably engage the interior wall surfaces of the triangular cross-section chamber 14 to provide the necessary guiding action. At their bottom portion, the rods 15a are rigidly connected to a U-shaped stamping 15c and a threaded stud 15d is rigidly secured to the bottom base portion of the U-shaped stamping 15c. Such stud is employed to effect the detachable securement of a float 16 to the frame 15. Float 16 is, of course, at least partially immersed in the liquid contents of the reservoir 1 and is suitably designed so as to shift the entire frame 15 vertically, as the level of the liquid contents vary.

Figure 5:
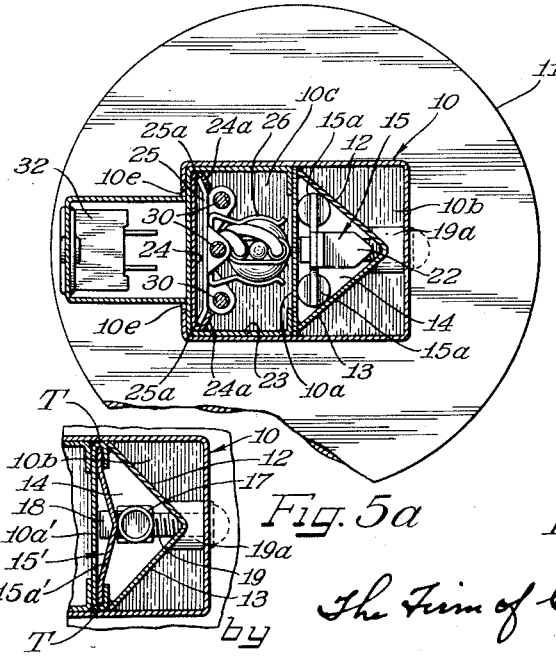
Figure 5 is a sectional view taken on the plane V—V of Figure 2.
Figure 5A:
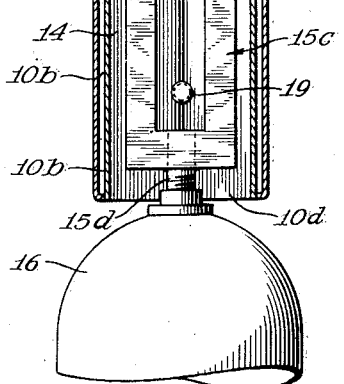
Figure 5a is a fragmentary sectional view similar to Figure 5 but showing an alternate carrier and guide arrangement.

In the alternative arrangement shown in Figure 5a, the frame 15 is replaced with a plate carrier 15' and the wall 10a' is rolled at its ends to provide tracks receiving the side edges of the plate. As shown in Figure 5a, a metal plate 15a' has its side edges slidably guided in tracks T provided by the rolled ends of the wall 10a'. This plate is rigidified by a V-shaped bend along its longitudinal central portion and carries the magnet 18 in the same manner as the rod carrier 15.

At the top end of the rods 15a of the frame 15, a generally T-shaped stamping 15e is rigidly secured thereto. The stem portion of the stamping 15e extends downwardly between the parallel rods 15a and this stem portion is in turn rigidly secured to a magnet mounting sleeve 17.

Figure 6:
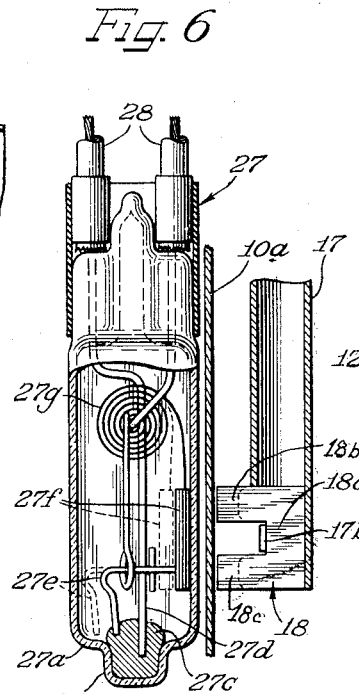
Figure 6 is an enlarged scale sectional view, illustrating the cooperation of the float controlled magnet with one of the magnetically operated switches.

I preferably employ a permanent magnet formed of a well known alloy having very high magnetic retentivity characteristics and, as best shown in Figure 6, such magnet 18 is of generally U-shaped configuration. The end of the magnet mounting sleeve 17 is longitudinally slit and the wall portion thereof deformed outwardly, as indicated at 17a, to provide a pocket to permit the lug insertion of the base portion 18a of the U-shaped magnet 18 therein. Then, the central portions 17b of the struck out tabs 17a are both deformed inwardly, as best shown in Figure 4, to overlie the base portion 18a of the U-shaped magnet 18 and thus effect the rigid securement of the magnet element 18 to the frame 15. It will be noted that the magnet 18 is supported with its pole pieces 18b and 18c superimposed (Figure 6) and disposed in close facing proximity to the common wall 10a of the casing 10. Hence, as the float 16 rises and falls as the level of the liquid in the container 1 varies, the magnet 18 is caused to traverse a substantially vertical path along the fluid exposed face of the common wall 10a.

To limit the downward movement of the frame 15, a screw stop 19 is threaded through a brass nut 19a extending between the apex of the plates 12 and 13 and the adjacent wall of the casing 10. This nut is secured to the plates as by brazing or soldering. A gasket 19b is interposed between the head of the screw 19 and the casing 10 to seal the screw hole in the casing. The screw 19 extends transversely in the lower portion of the primary chamber 14, projecting between the parallel rods 15a and thus engaging the bottom face of the magnet support sleeve 17 whenever the level of liquid within the liquid container 1 drops sufficiently to lower the frame 15 to such a point. The upward travel of the frame 15, and hence the magnet 18, is limited by an adjusting screw 20 which is threadably mounted in a sleeve 21 which is crimped in place in a suitable aperture in the top wall of the primary chamber 10b. The inserted end of the adjusting screw 20 cooperates with a horizontally projecting tab member 22 which is rigidly secured to the T-shaped stamping 15e.

A generally channel-shaped switch casing 23 is provided which is of substantially the same length as the secondary chamber 10c and is slidably inserted therein through the open top wall of the chamber 10c. A guide plate 24 is rigidly secured to the base portion of the channel-shaped member 23 and has inturned end portions 24a which define a pair of opposed slide tracks extending vertically throughout substantially the entire length of the secondary chamber 10c.

One or more magnetic switch supporting carriages 25 are then slidably mounted in the slide track defined by the inturned edges 24a. Carriages 25 have a plate-like base portion having downturned edges 25a which engage behind the inturned slide track edge portions 25a. On such base portion, a pair of spring clips 26 are suitably mounted and such clips serve to detachably mount a magnetic switch device 27.

Magnetic switch devices 27 constitute any conventional form of switch wherein either a contact closing, or contact opening action is produced by the alignment therewith of a magnet or other element capable of producing a magnetic field to penetrate the interior of the switch device 27. As best shown in Figure 6, magnetic switch device 27 preferably constitutes a form that is commercially available wherein a glass casing 27a defines a well portion 27b within which is disposed a drop of mercury 27c. A fixed contact 27d is immersed in the mercury drop 27c, and a movable contact wire 27e is selectively shiftable into and out of the mercury drop 27c by a ferromagnetic plate 27f which is disposed immediately adjacent the glass wall of the container. The particular type of switch shown is of the normally open contact type, and hence the ferromagnetic plate 27f is supported and resiliently urged to the open contact position by a torsion spring 27g.

Suitable conductors 28 are brought out from the glass casing 27a and are connected to terminals 29a provided upon a conventional terminal strip 29 mounted upon the outer face of the base wall of the channel-shaped switch casing 23.

Any desired number of magnetically operated switch devices 27 may be adjustably mounted within the secondary chamber 10c, depending upon the space available and the type of control action that is desired in response to variations in level of the liquid in the container 1. In the particular example shown in the drawings, three such magnetically operated switches 27 are disposed in the chamber 10c, each of such switch devices being of identical construction and each being detachably mounted on an identical carriage 25 which is slidably supported in the vertical slide tracks defined by the plate 24. When thus mounted, each of the switch devices 27 is disposed so that the ferromagnetic armature plate portion 27f will lie closely adjacent to the common wall 10a of the casing 10, and hence in position to be actuated by the float control magnet 18 when such magnet is aligned therewith on the opposite side of the common wall 10a.

It is obviously desirable to provide a limited range of adjustment of the vertical position of each of magnetic switch devices 27 relative to the common wall 10a, and such adjustment may be conveniently effected by an adjusting screw 30 which has one end thereof threadably engaged in a boss 25c rigidly secured to a particular switch carriage 25 and the other end thereof projecting out of the top wall 23g formed on the channel-shaped switch casing 23. A large head portion 30a of the adjusting screw is disposed exteriorly of the top wall 23g and a bushing 30b is secured to the adjusting screw 30 on the under side of the top wall 23g to prevent axial displacement of the adjusting screw 30 relative to the switch casing 23, but to permit unimpeded rotational adjustment thereof. Accordingly, rotation of adjusting screws 30 will vertically shift the position of the respective switch carriages 25 and hence adjust the vertical positions of the particular magnetic switch devices 27 carried by such carriages.

In this manner, the switch devices may be vertically aligned to provide a control action at certain predetermined levels of the liquid in the container 1. In the particular example shown in the drawings, a control action is produced at three positions corresponding respectively to an empty position of liquid container 1, a half full position, and a full position. Note that the stop screws 19 and 20 which limit the upward and downward travel of the frame 15 also serve to prevent the magnet 18 from being carried beyond the uppermost and lowermost switch devices 27. Hence, all possibility of an erroneous control action being produced by an overtravel of the actuating magnet 18 with respect to the limiting switches 27 is eliminated.

A sheet metal, generally rectangular closure stamping 31 is provided to surround the terminal strip 29 and substantially completely enclose the secondary chamber 10c. Since the secondary chamber 10c is open only to the atmosphere external of the liquid container 1, it is not generally necessary that the closure stamping 31 effect a sealing engagement with the casing 10. A conventional female receptacle plug 32 may be supported in one wall of the closure stamping 31, as by rivets 32a, and suitably electrically connected to the terminals 29a so that all electrical connections to the various magnetically operated switches 27 may be conveniently accomplished by insertion of a complementary shaped male receptacle plug in the female receptacle plug 32. Closure stamping 31 is preferably detachably secured to the casing 10 as by screws 31a.

In the event that it is desired to replace or repair any of the magnetic switch units 27, such may be conveniently done without disassembling the entire liquid level transmitter from the liquid container 1. For example, the channel-shaped switch casing 23 and the closure stamping 31 may be slidably withdrawn from the secondary chamber 10c, carrying with it all of the magnetically operated switches 27. The closure stamping 31 may then be removed from the casing 27 giving access to the lead wires. The magnetic switch units 27 can then be repaired, replaced, or adjusted with the utmost ease. Furthermore, the provision of adjusting screws 30 associated with each of the switch carriages 25 assures that proper adjustment of the exact liquid level at which the required control action is produced may be conveniently carried out after the entire unit is assembled to the liquid container 1.

It should be further noted that all of the electrical elements of the device, particularly the magnetically operated switches, are completely isolated from the liquid or vapor content of the liquid container 1. Hence, there is no problem of corrosion or deposition interfering with the reliable operation of the magnetic switches 27. While the primary chamber 10b and the frame 15 are subject to contact with the liquids or vapors of the liquid container 1, the sliding engagement between the frame 15 and the primary chamber 10b prevents the accumulation of any substantial deposits therein, inasmuch as any deposits will be scraped off by the sliding inter-engagement. Hence, the described liquid level transmitter will continue to operate reliably for long periods and need not be removed for cleaning or removal of lime deposits until the entire liquid container 1 has sufficient deposit therein to require such action.

It is desired to particularly point that all of the components of the described liquid level electrical transmitter are of unusually simple configuration and may be produced either by stamping operations or by automatic screw machines. Accordingly, the overall production cost of the described unit may be maintained at a minimum.

It will, of course, be understood that various details of construction may be modified through a wide range without departing from the principles of this invention and it is, therefore, not the purpose to limit the patent granted hereon otherwise than necessitated by the scope of the appended claims.

I claim as my invention:

1. A liquid level electrical transmitter device comprising an elongated box-like casing adapted to be secured in a closed container in a generally vertical position and having one end projecting into the container and the other end disposed exteriorly of the container, said casing having a central vertical wall dividing the interior thereof into a primary and a secondary chamber, said inserted end of the casing being apertured to provide communication between said primary chamber and the interior of the container, said non-inserted end of the casing being apertured to provide communication between the secondary chamber and the exterior of the container, means defining a first vertical slide track, a frame slidably guided by said first vertical slide track, a U-shaped magnet carried by said frame with the poles thereof in superimposed position and facing the central vertical wall for movement adjacent said central vertical wall, a float secured to the bottom end of said frame and adapted for immersion in the liquid in the container being vertically movable with the level of liquid in the container, a switch casing removably inserted in said secondary chamber, said switch casing defining a vertically extending second slide track, a carriage movable along said second slide track, means accessible exteriorly of said switch casing for adjusting the vertical position of said carriage on said second slide track, and a magnetically operable switch detachably mounted on said carriage and supported thereby adjacent said central vertical wall, said switch being operable by alignment of said magnet therewith on the opposite side of said central vertical wall.

2. A liquid level electrical transmitter comprising a substantially nonmagnetic wall member having one face adapted to be exposed to the liquid contents of a container and the other face isolated therefrom, a float controlled magnet vertically movable along said exposed face of said wall member as a function of the liquid level in the container, means defining an elongated, open end chamber adjacent the isolated face of said non-magnetic wall, a switch casing removably inserted in said elongated chamber, said switch casing defining a vertically extending slide track, a carriage movable along said slide track, means accessible exteriorly of said switch casing for adjusting the vertical position of said carriage on said slide track, and a magnetically operable switch detachably mounted on said carriage and supported thereby adjacent said nonmagnetic wall, said switch being operable by alignment of said magnet therewith on the opposite side of said nonmagnetic wall.

3. A liquid level electrical transmitter adapted for a container such as an automatic coffee urn comprising a casing, a non-magnetic wall dividing said casing into a primary compartment and a secondary compartment, said non-magnetic wall having one face adapted to be exposed to the liquid contents of a container in the primary compartment and having the other face isolated from said liquid contents in the secondary compartment, said non-magnetic wall having overlaped sides defining opposed vertical tracks on the side of the wall facing the primary compartment, a carrier slidable on said tracks, a float controlled magnet on said carrier vertically movable along the exposed face of said non-magnetic wall and having the poles thereof in superimposed position facing said wall, a plurality of magnetically operable switches in superimposed relation in said secondary compartment, means mounting each of said switches for independent vertical movement in said secondary compartment, and individual means accessible from the outside of said casing for each mounting means and adapted to adjust the vertical position of each switch in said secondary compartment, whereby lines of force passing vertically between the superimposed poles of the magnet will be effective through the non-magnetic wall to promptly actuate the switches as the float carries the magnet into alignment with the switches.

4. In an automatic coffee urn, a liquid-containing reservoir, and a liquid level electrical transmitter mounted therein, said transmitter comprising a casing in the top of the reservoir, a non-magnetic wall dividing said casing into a primary compartment and a secondary compartment, said primary compartment being in communication with said reservoir and said secondary compartment being isolated therefrom in sealed relation therewith, a switch casing removably inserted in said secondary compartment, said switch casing defining a first track means in said secondary compartment, vertically adjustable carriages mounted on said first track means, adjusting means accessible from the outside of said primary compartment and reservoir to regulate the positions of said carriages, a magnetically operated switch on each of said carriages, a second track means in said primary compartment, a carrier reciprocable thereon, a U-shaped magnet on said carrier having the poles in superimposed relation and in closely disposed confronting relation to said non-magnetic wall, and a float in said reservoir operating said carrier, whereby said magnet may be reciprocated relative to said switches in response to variations in liquid level in the reservoir for selective cyclic actuation of said switches.

5. In a liquid level electrical transmitter adapted for a coffee urn to control electrical impulses in response to levels of a float which comprises a casing, a vertical non-magnetic wall dividing said casing into a closed switch compartment and a float compartment having an open bottom, said wall having overlapped sides defining opposed vertical tracks on the side of the wall facing the open bottom compartment, a carrier slidable in said tracks, a magnet on said carrier having the poles thereof in superimposed position facing said wall in close proximity therewith, a float depending from said carrier for raising and lowering the magnet in response to variations in level, a switch casing removably inserted in said closed switch compartment, a plurality of magnetically operable switches positioned in superimposed relation in the switch casing for selective actuation by lines of force between the pole pieces of the magnet acting through the non-magnetic wall, and an adjustor accessible from outside of said switch compartment for regulating the position of each switch in the casing.

HERBERT E. KAMINKY.

REFERENCES CITED

The following references are of record in the file of this patent:

UNITED STATES PATENTS

| Number | Name | Date |
|---|---|---|
| 995,414 | Nault | June 13, 1911 |
| 1,081,843 | Larson | Dec. 16, 1913 |
| 1,834,934 | Brach | Dec. 8, 1931 |
| 1,910,091 | Collier | May 23, 1933 |
| 2,167,962 | Sovis | Aug. 1, 1939 |
| 2,292,648 | Moore | Aug. 11, 1942 |
| 2,307,205 | Ewald et al. | Jan. 5, 1943 |
| 2,336,326 | Weckerly | Dec. 7, 1943 |
| 2,352,830 | Ford | July 4, 1944 |
| 2,419,942 | Brewer | May 6, 1947 |
| 2,448,251 | Campbell | Aug. 31, 1948 |